US005378104A

United States Patent [19]

Payne, Jr.

[11] Patent Number: 5,378,104

[45] Date of Patent: Jan. 3, 1995

[54] APPARATUS FOR LIFTING A LARGE ROLL OF PAPER

[76] Inventor: J. Edwin Payne, Jr., R.R. #1, Box 670, Perkins, Okla. 74059

[21] Appl. No.: 906,532

[22] Filed: Jun. 30, 1992

[51] Int. Cl.[6] .......................... B60P 3/00; B21C 47/24; F15B 11/00

[52] U.S. Cl. .......................... 414/460; 414/910; 414/911; 242/592; 242/598.3; 242/598.5; 91/520

[58] Field of Search ............... 414/460, 447, 459, 910, 414/911; 254/324; 242/58.6, 79

[56] References Cited

U.S. PATENT DOCUMENTS

| | | | |
|---|---|---|---|
| 1,874,904 | 8/1932 | Crafts . | |
| 3,329,369 | 7/1967 | Guthrie | 242/58.6 |
| 3,476,016 | 11/1969 | Dixon et al. | 91/520 |
| 4,148,406 | 4/1979 | Kutzschebauch | 414/458 |
| 4,165,052 | 8/1979 | Scibert | 242/79 |
| 4,209,140 | 6/1980 | Seibert | 242/58.6 |
| 4,295,777 | 10/1981 | Bell et al. | 414/458 |
| 4,339,093 | 7/1982 | Shanklin et al. | 242/58.6 |
| 4,364,706 | 12/1982 | Kranzlmuller | 414/911 |
| 4,371,308 | 2/1983 | Skalleberg | 414/911 |
| 4,447,012 | 5/1984 | Woodruff | 242/54 R |
| 4,593,883 | 6/1986 | Nelson | 254/7 B |
| 4,687,244 | 8/1987 | Cullen et al. | 294/86.41 |
| 4,696,616 | 9/1987 | Avey | 414/417 |
| 4,720,231 | 1/1988 | Pienta | 414/911 |
| 4,740,131 | 4/1988 | Mayle | 414/460 |
| 4,856,960 | 8/1989 | Wheeler et al. | 414/684 |
| 4,861,219 | 8/1989 | Mayle | 414/469 |
| 4,951,894 | 8/1990 | Young, Jr. et al. | 242/58.6 |
| 5,002,235 | 3/1991 | Greer et al. | 242/58.6 |
| 5,056,982 | 10/1991 | Stockham | 414/607 |
| 5,087,166 | 2/1992 | Honegger | 414/458 |
| 5,096,357 | 3/1992 | Galbani | 414/911 |

FOREIGN PATENT DOCUMENTS

| | | | |
|---|---|---|---|
| 391061 | 10/1990 | European Pat. Off. | 242/58.6 |
| 674968 | 7/1979 | U.S.S.R. | 212/146 |

*Primary Examiner*—Frank E. Werner
*Assistant Examiner*—R. B. Johnson
*Attorney, Agent, or Firm*—Catalano, Zingerman & McKay

[57] ABSTRACT

A device for raising and lowering a paper roll used in a printing press. This device is comprised of an inverted U-shaped frame made up of a horizontal member supported by two vertical members. Two hydraulic cylinders are supported by the horizontal member so that each extends substantially parallel to a vertical member of the frame. A hydraulic power unit is attached to the top of the horizontal member to actuate the hydraulic cylinders. A hydraulic directional control valve controls the direction of flow of hydraulic fluid in order to effectuate the extension and retraction of the hydraulic cylinders and thereby raise and lower the paper roll.

3 Claims, 2 Drawing Sheets

HYDRAULIC POWER UNIT
MANUAL
A
B
42
43
46
48
50
52
54
56
58
60
62
64
22
24
26
28
38
12
16
36
70
72
20

APPARATUS FOR LIFTING A LARGE ROLL OF PAPER

BACKGROUND OF THE INVENTION

1. Field Of The Invention

This invention relates to devices for raising and lowering a web.

2. Description Of The Related Art

A need has developed among small printing operators for a device which is capable of raising a web such as a paper roll and lowering it onto a transporting device such as a wheeled dolly so that the web can be easily moved, generally to be mounted onto a printing press. The need for this type of device is obvious considering the fact that paper rolls used in printing operations could weigh anywhere from 800 to 2,000 pounds each, and generally are about four feet in diameter.

The common present method for accomplishing this purpose is the construction of a ramp out of wood or suitable material and rolling the web up the ramp, off its raised end, and onto the dolly. This method requires a substantial amount of space since the operator must start rolling the web a sufficient distance from the ramp in order to gain enough momentum for the roll to completely ascend the ramp. If insufficient momentum is obtained, the web will not completely ascend the ramp and begin to accelerate in the opposite direction toward the operator. If the web gains too much momentum before its ascent up the ramp, it may carry off the end of the ramp and over the dolly. Either way, this method is difficult, requires a substantial amount of space, and could even be dangerous to the operator.

This same procedure must be carried out several times a day as more paper is required by the press. It is quite common even for small printing operations to use between eight and 12 rolls of paper per day, traditionally requiring the ramp procedure to be repeated as many times.

Therefore, a need in the industry exists for a device that is capable of raising these heavy and cumbersome paper rolls and other such webbed articles and lowering them onto a dolly so that the paper can be transported to a remote destination such as the printing press. In addition, this device must be durable, easily operable, yet cost effective in order to appeal to the operator of a small printing operation. These problems are solved by the present invention.

SUMMARY OF THE INVENTION

It is the purpose of this invention to obtain a device for raising a web such as a paper roll off the ground a sufficient distance so that the web can be transported or lowered by the device onto a transporting apparatus, such as a dolly.

An additional purpose is to provide an apparatus for lifting webs of material which is sturdy, easily operable, and economically attractive to the operator.

An apparatus to accomplish these purposes is comprised of an inverted U-shaped frame including a horizontal member supported by two vertical members. Two hydraulic cylinders are fixed to the horizontal member at points adjacent to each of the vertical members of the frame such that the cylinders extend from the horizontal member parallel to the vertical member. A horizontal rod is supported from the lower end of the piston rods of each of the hydraulic cylinders opposite to, and parallel with, the horizontal member of the frame. The rod is positioned such that it extends from one cylinder, through the web to be lifted, and secured to the cylinder on the other end of the frame, thereby providing the support means to be used when lifting the web.

A hydraulic power supply is provided to actuate the hydraulic cylinders which lift the rod, and thereby the web. This power supply is comprised of a hydraulic fluid pump, a hydraulic fluid reservoir and a network of hydraulic fluid lines extending to and from the hydraulic cylinders, which are connected in series. A valve is connected in this series which has three positions. A first position allows flow of hydraulic fluid in a first direction A in order to retract the hydraulic cylinders to raise the web. A second position of the valve allows flow of hydraulic fluid in a second direction B in order to extend the hydraulic cylinders to lower the web. A third position prevents flow in either direction and acts as a neutral position where the hydraulic cylinders neither retract nor extend.

Power to the hydraulic fluid pump is provided by a 12-volt battery fixed to the horizontal member of the frame. This battery is wired to a starter solenoid which acts as a switch to allow or prevent current from actuating the pump.

This device is sturdy, simple to operate, and can be constructed in such a manner that it can be economically attractive to small printing operations, or any industry which requires the manipulation of heavy webs of material. In addition, the apparatus takes up an amount of space only slightly larger than the web itself.

DETAILED DESCRIPTION OF THE PREFERRED EMBODIMENT

Figure 1:
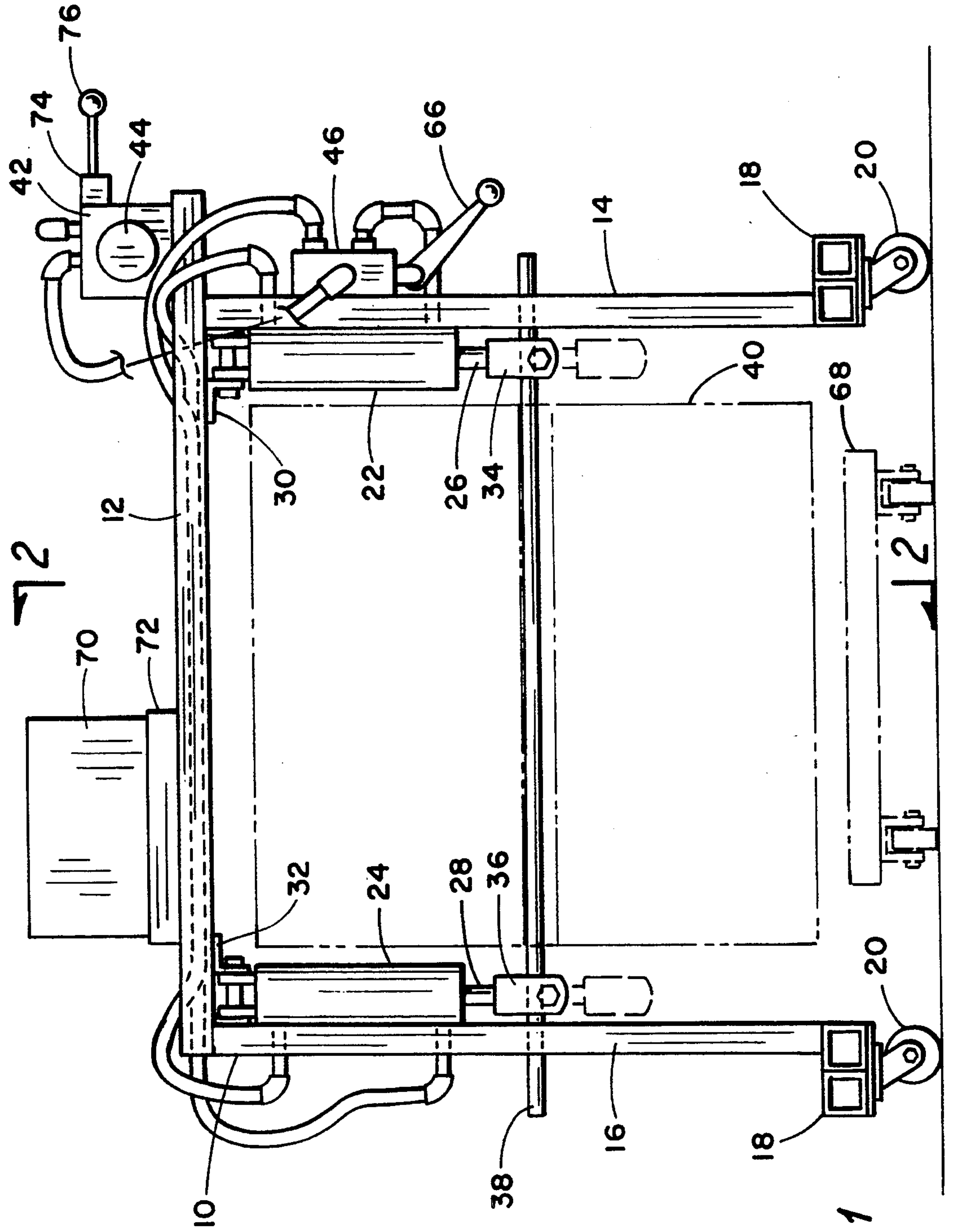
FIG. 1 is a front view of the apparatus as it would be seen lifting a web above a wheeled dolly.

The drawings illustrate the preferred embodiment of this invention. An apparatus for raising or lowering a web is shown in FIG. 1. Shown thereon is U-shaped frame 10. This frame includes a horizontal member 12 fixed to two spread apart vertical members 14 and 16. As seen in FIG. 1, horizontal member 12 may extend beyond vertical members 14 and 16. The two vertical members 14 and 16 and the horizontal member 12 can be constructed from any suitable material. These vertical members can be fixed to the horizontal member by any fastening system, such as welding, bolts or the like.

Figures 2, 3, 4, 5:
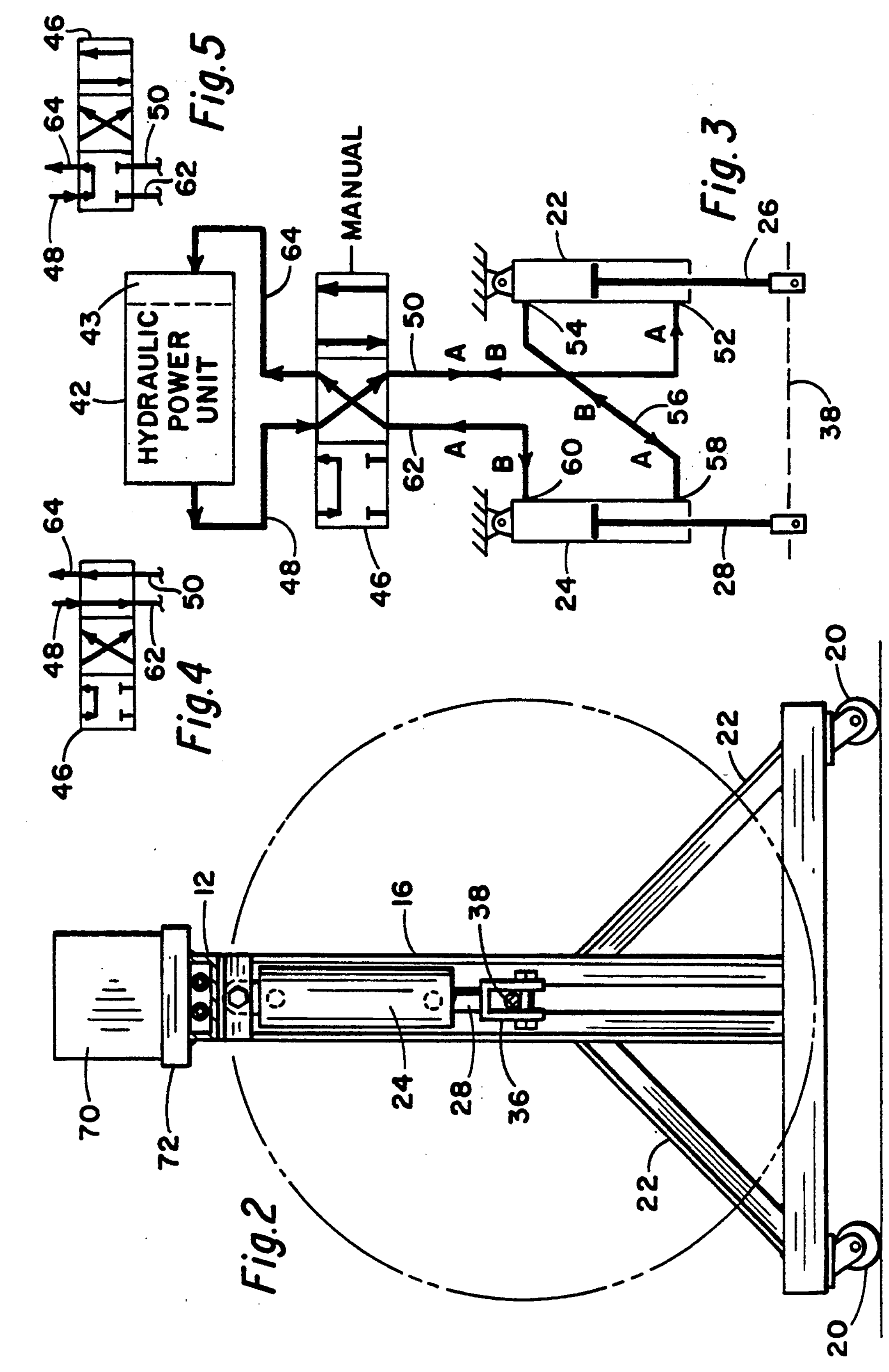
FIG. 2 is a view of the apparatus taken along line 2—2 of FIG. 1.
FIG. 3 is a diagram depicting the flow of hydraulic fluid through the apparatus depicted in an A direction and a B direction, controlled by a hydraulic directional control valve shown in FIG. 3 to allow flow in the A direction.
FIG. 4 is an enlarged schematic view of the hydraulic directional control valve of FIG. 3 wherein the valve is allowing flow in the B direction.
FIG. 5 is an enlarged schematic view of the hydraulic directional control valve of FIG. 3 wherein the valve is positioned so that no flow of hydraulic fluid will take place.

FIG. 2 depicts a view taken along line 2—2 of FIG. 1. From this view, vertical member 16 can be seen. The two pieces of angle iron comprising vertical member 16 can be spaced from one another so that horizontal member 12 can be passed therethrough. Vertical member 16 can either extend to the ground or may be supported as shown in FIG. 2 where vertical member 16 is welded to a base member 18. Base 18 may also either contact the ground or wheels 20 can be added to provide mobility to the invention. Supports 22 may also be added extending from a point on vertical member 16 to base 18 to provide added stability to the apparatus. Referring back to FIG. 1, base 18 may be constructed of square tubing or some such suitable material to which wheels 20 may be attached. Vertical member 14 is supported in the same manner as vertical member 16.

A pair of hydraulic cylinders 22 and 24 containing pistons 26 and 28 are fixed to horizontal member 12 of frame 10. Cylinder 22 is fixed to horizontal member 12 at a point adjacent to vertical member 14 and extending parallel thereto. Likewise, cylinder 24 is fixed to horizontal member 12 at a point adjacent to vertical member 16 and extending parallel thereto. Cylinders 24 and 26 may be fixed to horizontal member 12 by any suitable manner such as by welding brackets 30 and 32 to the underside of horizontal member 12. Hydraulic cylinders 22 and 24 are thereafter bolted to brackets 30 and 32.

A clevis 34 and 36 is attached to the end of each piston rod 26 and 28 of hydraulic cylinders 22 and 24. These clevises support a horizontal rod 38. Rod 38 provides support for web of paper 40 when it is raised and lowered. FIG. 2 depicts the manner in which rod 38 is secured or supported in clevis 36 which in turn is fixed to piston rod 28 of hydraulic cylinder 24. Rod 38 is likewise supported by clevis 34.

Rod 38 in FIG. 1 is shown as extending through clevis 34 at one end of frame 10, web 40 and clevis 36 on the other end of frame 10. Rod 38 may be of a length so as to protrude through the space in the angle iron comprising vertical members 14 and 16 of frame 10. In this manner, the apparatus is given torsional stability by preventing torsional sway of web 40 on rod 38.

Hydraulic power unit, generally 42, is fixed to horizontal member 12 of frame 10 and is shown positioned on the portion of horizontal member 12 which extends past vertical member 14. Hydraulic power means 42 is comprised of a hydraulic fluid pump 44, a hydraulic fluid reservoir 43 (shown in FIG. 3), a hydraulic directional control valve 46, and a plurality of hydraulic fluid lines servicing hydraulic cylinders 22 and 24 and returning to hydraulic power means 42.

The hydraulic power system is depicted in the diagram of FIG. 3. The flow of hydraulic fluid begins from the power side of the hydraulic fluid pump 44 of hydraulic power unit 42 and is pumped under pressure through a first hydraulic fluid line 48 to the hydraulic directional control valve 46. The hydraulic directional control valve 46 has three positions which regulate the direction in which the hydraulic fluid flows within the hydraulic fluid lines in order to extend or retract hydraulic cylinders 22 and 24. Such a valve is available commercially from sources such as Cross Manufacturing, Inc.

When hydraulic directional control valve 46 is in a first position, as depicted in FIG. 3, hydraulic fluid flows in a direction A via a second hydraulic fluid line 50 to a lower port 52 of the first hydraulic cylinder 22. Lower port 52 is positioned in such a manner that when fluid enters, the pressure forces up the piston connected to piston rod 26 within hydraulic cylinder 22. The hydraulic fluid displaced within hydraulic cylinder 22 above the piston exits hydraulic cylinder 22 through an upper port 54. This displaced hydraulic fluid is carried under pressure through a third hydraulic fluid line 56 from the first hydraulic cylinder 22 to the lower port 58 of the second hydraulic cylinder 24. Likewise, this pressure forces up the piston connected to piston rod 28 within the second hydraulic cylinder 24. The retraction of cylinders 22 and 24 raises rod 38 and thereby web 40.

When the second hydraulic cylinder 24 retracts, the displaced fluid from cylinder 24 exits through upper port 60 via a fourth hydraulic fluid line 62 and returns to hydraulic directional control valve 46. A fifth hydraulic fluid line 64 extends from the hydraulic directional control valve 46 to return the hydraulic fluid to a reservoir which feeds the return side of the hydraulic fluid pump within hydraulic power unit 42.

FIG. 4 is an enlarged view of the hydraulic directional control valve 46 of FIG. 3. When valve 46 is positioned in a second position as shown in FIG. 4, the hydraulic fluid in FIG. 3 will flow in the B direction so that when hydraulic fluid enters the hydraulic fluid directional control valve 46 through hydraulic fluid line 48, it will exit valve 46 through hydraulic fluid line 62 and enter the second hydraulic cylinder 24 through its upper port 60. This entering fluid forces down the piston within cylinder 24 thereby extending piston rod 28. When the piston in cylinder 24 is forced down, hydraulic fluid exits the second hydraulic cylinder 24 through lower port 58 via hydraulic fluid line 56 and enters the first hydraulic cylinder 22 through its upper port 54. This entering fluid forces down the piston inside cylinder 22 and extends piston rod 26. When piston rods 28 and 26 extend, the web is lowered.

When the piston within cylinder 22 is forced down, the displaced fluid exits through lower port 52 through hydraulic fluid line 50 into hydraulic directional control valve 46. From hydraulic directional control valve 46, the fluid returns to hydraulic power unit 42 through hydraulic fluid line 64.

FIG. 5 is an enlarged view of the hydraulic directional control valve 46 of FIG. 3 depicting a third, or neutral position. When the valve is in this position, there is no flow of hydraulic fluid from the hydraulic directional control valve 46 to hydraulic cylinders 22 and 24. In FIG. 1, handle 66 controls hydraulic directional control valve 46 and allows manual operation between its three positions. Handle 66 is biased toward the third, or neutral position in order to prevent undesired extension or retraction of hydraulic cylinders 22 and 24.

Since hydraulic cylinders 22 and 24 are connected in series, rephasing hydraulic cylinders are very suitable for this hydraulic application. Rephasing hydraulic cylinders incorporate an internal piston bypass which synchronizes, or rephases, hydraulic cylinders connected in series. Both cylinder rods 26 and 28 move equally when stroked. At the completion of each stroke, the system is resynchronized through an internal piston bypass in the rephasing cylinder. Rephasing hydraulic cylinders are commercially available from Cross Manufacturing, Inc.

In operation, when it is desired to lift a web of paper rod 38 is removed from clevises 34 and 36. The frame is then positioned over the web to be lifted. The cylinders 22 and 24 are operated to place the clevises at the same level as the center passage of the web. Then rod 38 is shoved through one clevis, through the center passage and on through the other clevis. The web is now in position to be lifted.

When hydraulic directional control valve 46 is in the position depicted in FIG. 3 and hydraulic fluid is flowing in the A direction, hydraulic cylinders 22 and 24 will retract and raise rod 38 of FIG. 1. When rod 38 is raised, paper roll 40 will also raise so that a dolly 68 may be positioned under roll 40. Thereafter, hydraulic directional control valve 46 can be positioned according to FIG. 4 so that hydraulic fluid will flow in the B direction of FIG. 3 and the web will be lowered onto dolly 68 to be transported e.g., to a printing press. After the web is lowered, rod 38 is removed and the dolly and web can then be moved independently. The rod 38 and lifting apparatus is then ready for its next job.

Referring to FIG. 1, a 12-volt battery 70 supplies power for the hydraulic power unit 42. A battery case 72 is fixed to the top of horizontal member 12 of frame 10 to support battery 70. Battery 70 is grounded to frame 10 and wired to a starter solenoid which is mounted on hydraulic power unit 42. Starter solenoid 74 is wired to hydraulic fluid pump 44 and has an "on" position and an "off" position. When in the "on" position, solenoid 74 provides electric current to actuate hydraulic fluid pump 44. When in the "off" position, electric current is prohibited from reaching pump 44. Handle 76 on solenoid 74 provides manual operation between the "on" and "off" positions. Handle 76 is biased toward the "off" position in order to prevent unnecessary discharge of battery 70 or undesired flow of hydraulic fluid from pump 44.

The invention operates efficiently so as to place very little drain on battery 70. The duration of charge of battery 70 is a function of the weight of the paper roll being lifted and the number of rolls lifted per day. By way of example, if an average of 10 paper rolls weighing approximately 800 pounds are lifted per day, a typical battery 70 will remain charged for up to 30 days before recharging will be necessary.

Since handle 76, which manually controls starter solenoid 74 is biased toward the "off" position and handle 66 which manually controls hydraulic directional control valve 46 is biased toward the neutral position, two hands must be used to operate the invention which helps prevent any accidental placement of a hand in a moving part. In order to operate the invention, one hand is placed on handle 76 of starter solenoid 74 to manually engage solenoid 74 in the "on" position so that electric current flows from battery 70 to hydraulic fluid pump 44. Hydraulic fluid begins to flow from hydraulic fluid pump 44 to hydraulic directional control valve 46. A second hand is then placed on handle 66 of hydraulic directional control valve 46 in order to position valve 46 to either direct the flow of hydraulic fluid in the A direction or the B direction of FIG. 3 in order to raise or lower the paper roll as desired.

If handle 76 of solenoid 74 is released, it will return to the "off" position and hydraulic fluid pump 44 will discontinue to operate. If handle 66 of hydraulic directional control valve 46 is released, valve 46 will return to the position shown in FIG. 5 preventing flow of hydraulic fluid to either the first hydraulic cylinder 22 or the second hydraulic cylinder 24.

A single hydraulic cylinder could be used in this invention by extending the height of the frame 10 and positioning the hydraulic cylinder in such a fashion that a rope or chain could be extended from the piston end of the cylinder to each end of the rod protruding through the web. It should be equally apparent that a plurality of hydraulic cylinders could be employed.

While the invention has been described with a certain degree of particularity, it is manifest that many changes may be made in the details of construction without departing from the spirit and scope of this disclosure. It is understood that the invention is not limited to the embodiment sent forth herein for purposes of exemplification, but is to be limited only by the scope of the attached claim or claims, including the full range of equivalency to which each element thereof is entitled.

What is claimed is:

1. An apparatus to raise and lower a paper roll, comprising:

an inverted U-shaped frame including a horizontal member and two vertical members connected on each end thereof;

a first hydraulic cylinder containing a piston with a piston rod attached thereto and a second hydraulic cylinder containing a piston with a piston rod attached thereto, each cylinder supported from the horizontal member of said frame in a manner such that each cylinder is adjacent to and parallel with one of the vertical members with each said cylinder having an upper port and a lower port which are on opposite sides of the piston within each said cylinder;

a hydraulic fluid pump having a power side and a return side;

a starter solenoid to actuate the hydraulic fluid pump;

a power supply for driving said hydraulic fluid pump;

a pump starter means to control the actuation of the hydraulic fluid pump;

a hydraulic fluid reservoir;

a hydraulic directional control valve;

a paper roll support including a rod supported from the piston rod of the first hydraulic cylinder, extending through the paper roll and supported from the piston rod of the second hydraulic cylinder;

a first hydraulic fluid line containing hydraulic fluid therein extending from the power side of said hydraulic fluid pump to the hydraulic directional control valve;

a second hydraulic fluid line containing hydraulic fluid therein extending from the hydraulic directional control valve to the lower port of the first hydraulic cylinder;

a third hydraulic fluid line containing hydraulic fluid therein extending from the upper port of the first hydraulic cylinder to the lower port of said second hydraulic cylinder;

a fourth hydraulic fluid line containing hydraulic fluid therein extending from the upper port of the second hydraulic cylinder to the hydraulic directional control valve;

a fifth hydraulic fluid line containing hydraulic fluid therein extending from the hydraulic directional control valve to the hydraulic fluid reservoir.

2. The apparatus of claim 1 wherein the power supply for driving said hydraulic fluid pump is a 12 volt battery.

3. The apparatus of claim 1 wherein the hydraulic directional control valve has three positions;

a first position establishing fluid communication between the first and the second hydraulic fluid lines and further establishes fluid communication between said fourth and fifth hydraulic fluid lines;

a second position establishing fluid communication between said first and fourth hydraulic fluid lines and further establishing fluid communication between said second and fifth hydraulic fluid lines;

a third position wherein there is no flow of hydraulic fluid permitted through hydraulic directional control valve.

* * * * *